United States Patent
Schropp

(10) Patent No.: US 10,074,460 B2
(45) Date of Patent: Sep. 11, 2018

(54) MULTIFUNCTIONAL CABLE

(71) Applicant: LEONI KABEL GMBH, Nuremberg (DE)

(72) Inventor: Roland Schropp, Weissenburg (DE)

(73) Assignee: LEONI Kabel GmbH, Nuremberg (DE)

( * ) Notice: Subject to any disclaimer, the term of this patent is extended or adjusted under 35 U.S.C. 154(b) by 0 days.

(21) Appl. No.: 15/496,612

(22) Filed: Apr. 25, 2017

(65) Prior Publication Data

US 2017/0309371 A1    Oct. 26, 2017

(30) Foreign Application Priority Data

Apr. 25, 2016  (DE) .................. 10 2016 206 961

(51) Int. Cl.
*H01B 7/02*          (2006.01)
(52) U.S. Cl.
CPC .................. *H01B 7/0225* (2013.01)
(58) Field of Classification Search
CPC ..................................................... H01B 7/0225
USPC ............................................................ 174/113 R
See application file for complete search history.

(56) References Cited

U.S. PATENT DOCUMENTS

| | | | | |
|---|---|---|---|---|
| 3,800,066 | A | * | 3/1974 | Whitfill, Jr. ............ H01B 13/02 174/108 |
| 4,727,222 | A | * | 2/1988 | Sato .................. H01B 11/1041 174/108 |
| 5,132,490 | A | * | 7/1992 | Aldissi ............... H01B 11/1066 174/106 SC |
| 6,967,288 | B2 | | 11/2005 | Ohsawa et al. |
| 9,508,467 | B2 | * | 11/2016 | Pon ........................ H01B 9/003 |
| 2001/0021831 | A1 | * | 9/2001 | Fleischhacker .... A61B 17/3207 604/264 |
| 2014/0014395 | A1 | | 1/2014 | Toyama et al. |
| 2016/0200269 | A1 | | 7/2016 | Inoue et al. |

FOREIGN PATENT DOCUMENTS

| | | |
|---|---|---|
| DE | 10193456 T1 | 2/2002 |
| DE | 102013005901 A1 | 3/2014 |
| WO | 9948111 A1 | 9/1999 |

* cited by examiner

*Primary Examiner* — Timothy Thompson
*Assistant Examiner* — Charles Pizzuto
(74) *Attorney, Agent, or Firm* — Laurence A. Greenberg; Werner H. Stemer; Ralph E. Locher

(57) ABSTRACT

A multifunctional cable is particularly suitable for the automotive industry. The multifunctional cable has a plurality of functional elements. A core in the form of a sheathed line contains at least one inner functional element. At least one outer functional element is wound around the sheathed line core.

18 Claims, 1 Drawing Sheet

MULTIFUNCTIONAL CABLE

CROSS-REFERENCE TO RELATED APPLICATION

This application claims the priority, under 35 U.S.C. § 119, of German patent application DE 10 2016 206 961.6, filed Apr. 25, 2016; the prior application is herewith incorporated by reference in its entirety.

BACKGROUND OF THE INVENTION

Field of the Invention

The invention relates to a multifunctional cable which is designed, in particular, for the automobile industry, i.e., the motor vehicle sector.

In the automobile industry, so-called cable harnesses are usually prefabricated and then installed into body shells during final assembly for forming on-board motor vehicle electrical systems. In this case, the cable harnesses are generally produced on a special workbench, a so-called cable board, wherein the majority of working steps are executed manually. Consequently, the production of cable harnesses is relatively complicated.

Furthermore, the number of electrical consumers, sensors, control units etc. which are installed in a motor vehicle have recently steadily increased, as a result of which the number of electrical supply lines required and the number of signal lines required has also increased. Consequently, the complexity of a cable harness has increased from motor vehicle generation to motor vehicle generation. This firstly renders the manufacture of cable harnesses more and more complicated and secondly renders it increasingly difficult to install a cable harness into a motor vehicle.

In addition, the individual line elements of the cable are stranded with one another in many cables. Owing to the stranding, the individual line elements acquire a permanent wavy shape in parts, and this can lead to problems in principle. Therefore, for example assembly, that is to say, for example, stripping insulation from the individual line elements and subsequently fitting the individual line elements to plugs, is made more difficult as a result. This is true for automated line assembly in particular.

SUMMARY OF THE INVENTION

It is accordingly an object of the invention to provide a multi-functional cable which overcomes the above-mentioned and other disadvantages of the heretofore-known devices and methods of this general type and makes it easier to form an on-board electrical system, in particular for a motor vehicle.

With the foregoing and other objects in view there is provided, in accordance with the invention, a multifunctional cable, in particular a cable for automotive industrial applications. The cable comprising:

a core being a sheathed line and having at least one inner functional element; and at least one outer functional element wound around said sheathed line.

In other words, the multifunctional cable according to the invention has a plurality of functional elements and it is designed, in particular, for an on-board electrical system of a motor vehicle. Here, the multifunctional cable has a core which has at least one inner functional element. An outer functional element is wound or coiled around the core. Therefore, owing to the design of the multifunctional cable, the functional elements can be divided into inner functional elements on the one hand and outer functional elements on the other hand. In this case, that core is in the form of a sheathed line, in the simplest case in the form of a cable with a cable sheath and a cable core, for example an individual line element. The core, which is in the form of a sheathed line, typically has a plurality of line elements which are encased by an additional cable or insulating sheath.

A particular advantage of this refinement is that only the outer functional elements are wound around the core. However, the core itself and/or the inner functional elements preferably run in a straight line, and therefore they do not exhibit a wavy shape and as a result can be manufactured in a simple manner.

A multifunctional cable which is designed in such a way then forms, for example, a prefabricated structural unit or a prefabricated module which is generally combined with further typically different multifunctional cables and/or other modules to form a cable harness. In this case, a corresponding multifunctional cable module forms an arm or a branch in the on-board electrical system of the motor vehicle in the installed state in the motor vehicle in question, said arm or branch extending, for example, from a central control unit or an electrical energy source to a node point at which a plurality of electrical units are positioned.

That is to say, a corresponding multifunctional cable extends, for example, from a central control and distributor unit in the motor vehicle to one of the wheel arches of the motor vehicle where, for example, an ABS sensor and an electrohydraulic damper are installed. In this example, the multifunctional cable which is suitable for this application then has both the supply line for the electrohydraulic damper and also the signal line for the ABS sensor and therefore two different functional elements which are formed by two cables with different properties.

In a preferred refinement, the functional elements are therefore in the form of signal lines and in the form of electrical supply lines. In this case, the signal or data lines are in the form of, for example, shielded data lines.

Therefore, a corresponding multifunctional cable is typically matched to a very specific application in which the multifunctional cable has functional elements which are matched to specific functions, wherein a functional element is formed, for example, by a line element or cable with a specific rated current intensity.

A refinement of the multifunctional cable in which the core is untwisted, that is to say has no coiling, is preferred in this case. The core is therefore preferably not stranded with further cables or functional elements, in particular the outer functional elements, either. Instead, the core exhibits a straight profile on account of its design as a sheathed line in a stretched multifunctional cable, so that the length of the core corresponds to the length of the multifunctional cable. The at least one outer functional element is then wound around this virtually straight core, wherein at least two outer functional elements are typically wound around the core in the manner of a spiral.

Furthermore, the inner functional elements are preferably not stranded with one another, and therefore run in a straight line and merely form a bundle, without being stranded or twisted with one another.

Here, it is further advantageous when a press fit with a structurally prespecified press strength is formed between the core and the at least one outer functional element, so that the at least one outer functional element is virtually fixed to the core. Here, the press strength is prespecified, amongst other things, by a suitable selection of the rising height of the coiling of the at least one outer functional element, wherein the press strength decreases as the rising height increases. In this case, the press strength is selected, for example, in such a way that the core with the at least one outer functional element wrapped around it can be fed to an extrusion process in which an outer insulating sheath or outer sheath can be applied to the core around which said outer functional element is wound, without the at least one outer functional element slipping or shifting.

As already mentioned above, a multifunctional cable of the kind presented here is typically matched to a relatively specific application and accordingly multifunctional cables or multifunctional cable variants of different designs are provided for different applications. Here, the number of inner functional elements and/or outer functional elements in the multifunctional cable changes from application to application for example. In most cases, 1 to 7 inner functional elements and 1 to 12 outer functional elements are realized in the corresponding multifunctional cable. As an alternative or in addition to this, a corresponding multifunctional cable typically has functional elements of different designs, wherein, in particular, the inner functional elements differ from the outer functional elements.

Irrespective of this, each inner and/or each outer functional element are/is generally in the form of a line element or cable, that is to say in the form of an electrical conductor with an insulation. That is to say, the different functional elements are typically formed by line elements of different designs or different cables which differ, for example, in respect of the conductor cross section. As an alternative or in addition to this, line elements which are insulated to different extents and/or line elements with different conductor materials are provided for forming different functional elements.

In this case, the individual line elements expediently usually have round conductor cross sections with a conductor diameter in the range of from 0.4 mm to 2.5 mm. Here, the insulation of the conductors in question is preferably formed from a thermoplastic or crosslinked plastic/material and, in particular, from PVC, PVC-X, PE, PE-X, a TPE type, XLPE, a fluoropolymer, EVA or PVDF.

A refinement in which the different functional units are designed for different rated currents, that is to say for different current loadings, is further preferred. As an alternative or in addition to this, at least one functional element is formed by a cable with a braided conductor and at least one functional element is formed by a cable with a solid conductor. In the case of a line element with a solid conductor, said line element is preferably in the form of an inner functional element and therefore part of the core.

In this case, the functional elements, in particular outer functional elements, used are, in particular, wires, that is to say an electrical conductor which is surrounded by a wire insulation and which is in the form of, for example, a braided conductor or in the form of a solid conductor wire.

A design of the multifunctional cable in which the inner functional elements are formed by line elements for a power supply and in which the outer functional elements are formed by line elements for a signal line is particularly advantageous in this case.

According to an alternative variant, the core forms a signal cable which has a plurality of signal lines and preferably exclusively signal lines. The functional elements which are wound around the core are then preferably in the form of electrical supply lines, in particular wires.

In principle, it is possible to supply both supply lines and also signal lines as inner functional elements and/or as outer functional elements.

Furthermore, a design of the multifunctional cable in which the core has a core diameter which is larger than the diameter of the at least one outer functional element is typical. Here, the core diameter is generally larger than the diameter of the at least one functional element at least by a factor of 1.5, and preferably at least by a factor of 2.

Furthermore, the at least one outer functional element is typically wound around the core in such a way that there are functional element gaps between successive windings as seen in the longitudinal direction. In this case, there are typically also corresponding functional element gaps when a plurality of outer functional elements are wound around the core. Those functional element gaps are then usually free of further stranded elements, but in particular free of functional elements. Here, the functional element gaps typically have an extent in the longitudinal direction of the multifunctional cable which, depending on the design, corresponds to approximately 5 times to approximately 100 times the diameter of the at least one outer functional element. Accordingly, the extent in the longitudinal direction lies in the range of from 8.25 mm to 165 mm in the case of a diameter of the at least one outer functional element of 1.65 mm.

If a plurality of outer functional elements are provided, these are preferably wound around the core such that they bear against one another. Here, the outer functional elements lie next to one another on the core sheath and are wound around the core virtually in the form of a band, wherein functional element gaps are typically once again formed between the successive windings of this band.

In accordance with a preferred refinement of the multifunctional cable, said multifunctional cable has, as already indicated above, an outer insulating sheathing or an outer sheath which encases the core together with the outer functional elements which are wrapped around it.

In this case, the insulating material of the outer sheath expediently enters the functional element gaps and fills said functional element gaps. Therefore, the outer functional elements are in this respect virtually fixed by the outer sheath and embedded in said outer sheath. The outer sheath therefore has spiral grooves on its inner sheath side, the outer functional elements being accommodated in said spiral grooves.

In this case, said outer sheath is preferably formed by at least two extrusion processes which are executed in succession wherein, for example, a so-called tandem extruder is used for this purpose. Here, the first extrusion process typically serves to fill the functional element gaps with material. This extrusion process may be followed by further extrusion processes for filling the functional element gaps. A terminal or final insulating material layer which serves, in particular, to realize as round a cross section as possible for the multifunctional cable is then applied by way of a terminal extrusion process, typically as early as the second extrusion process.

Other features which are considered as characteristic for the invention are set forth in the appended claims.

Although the invention is illustrated and described herein as embodied in a multi-functional cable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
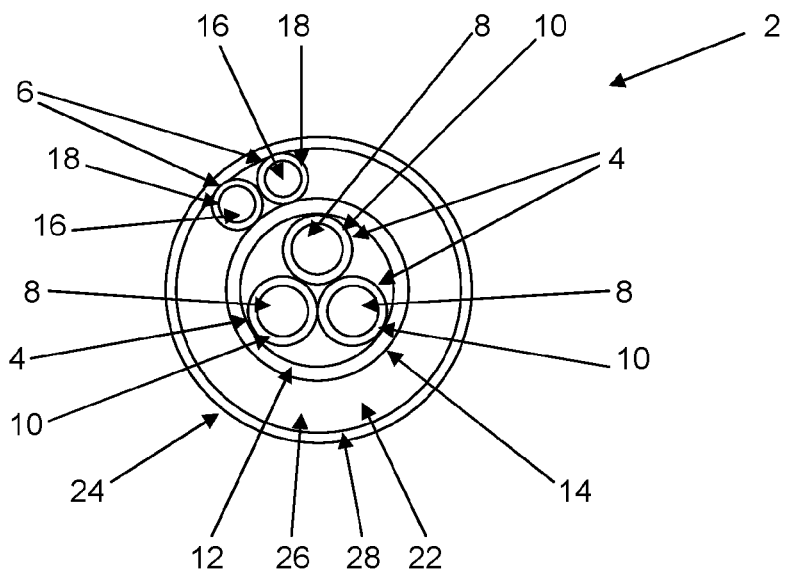
FIG. 1 shows a cross-sectional illustration of a multifunctional cable having an outer sheath.
Figure 2:
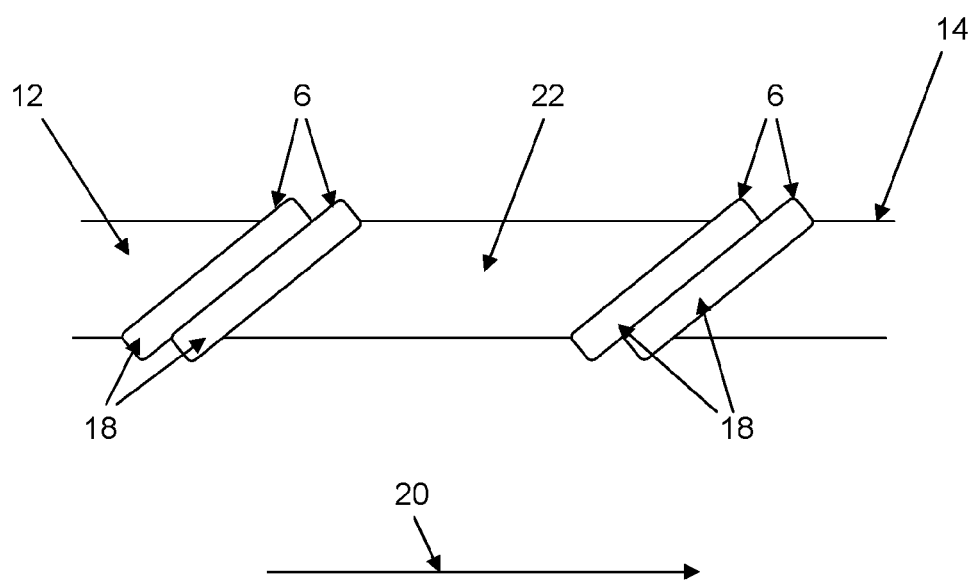
FIG. 2 shows a side view of the multifunctional cable without the outer sheath.

Referring now to the figures of the drawing in detail and first, particularly, to FIG. 1 thereof, there is shown a multifunctional cable 2 which is described by way of example in the text which follows and which is illustrated in FIG. 1 is intended for use in an on-board electrical system of a motor vehicle, not illustrated in any detail, and is suitably designed for this purpose. In this case, that multifunctional cable 2 has a plurality of functional elements, of which, in the exemplary embodiment, three are in the form of inner functional elements 4 and two are in the form of outer functional elements 6 owing to the design of the multifunctional cable 2. In this case, the functional elements 4, 6 are each in the form of a line element, in particular in the form of wires.

In the exemplary embodiment, each of the three inner functional elements 4 is formed by a wire which is formed by a conductor 8 and also a conductor insulation 10 which encases the conductor 8. The conductor 8 is a solid conductor, that is to say an individual wire, or else a braided conductor in which a plurality of individual fine wires are braided with one another. The three inner functional elements 4 are further encased by an insulating sheath 12, so that the three inner functional elements 4, together with the insulating sheath 12, form a sheathed line. As an alternative, the inner functional elements 4 can also be in the form of other line elements, in particular in the form of data or signal conductors. In this case, the inner functional elements 4 are preferably untwisted and not stranded with one another.

Here, that sheathed line forms the core 14 of the multifunctional cable 2, around which core the two outer functional elements 6 are wound. In the exemplary embodiment, the outer functional elements 6 are also formed by wires. However, these preferably have a braided conductor 16 which is encased by an insulation 18. Other refinements can also be provided for the outer functional elements 6.

Furthermore, the inner functional elements 4 preferably have a larger conductor diameter than the outer functional elements 6. Accordingly, the inner and outer functional elements are designed for different current loadings. In this case, the design of the line elements is matched to the intended function of each functional element. In the exemplary embodiment, all of the inner functional elements 4 are configured, by way of example, for transmitting power for supplying electrical consumers, whereas all of the outer functional elements 6 are provided and designed as signal lines.

In this case, the inner and/or the outer functional elements 4, 6 are preferably each in the form of single-wire line elements.

The multifunctional cable 2 is preferably matched to a specific application and accordingly a multifunctional cable 2 of different construction is produced for different applications. The inner functional elements 4 then differ from the outer functional elements 6, in respect of the conductor material, the material of the insulation, the conductor diameter and/or in respect of other properties, depending on the design.

In addition, the number of inner functional elements 4 on the one hand and the number of outer functional elements 6 on the other hand varies from one multifunctional cable 2 to another multifunctional cable 2.

Whereas the inner functional elements 4 of a multifunctional cable 2 usually differ from the outer functional elements 6, the inner functional elements 4 are typically of identical construction. The same generally applies for the outer functional elements 6 which are preferably likewise formed by substantially identical line elements, in particular single-wire line elements.

As already mentioned above, the outer functional elements 6 are preferably twisted or wound around the core 14, so that said outer functional elements run around the core 14 in the manner of a spiral in the multifunctional cable 2, at least provided that said multifunctional cable is in stretched form.

Furthermore, the outer functional elements 6 are preferably wound around the core 14 in the manner of a band comprising outer functional elements 6, so that the outer functional elements wrap around the core 14 such that they bear against one another. In this case, an expanded functional element gap 22 typically remains between two successive windings in the longitudinal direction 20 of the multifunctional cable 2. In this case, the gaps 22 have a larger width in the longitudinal direction 20 than a band width of the outer functional elements 6 which are situated next to one another. In this case, the width of the gap 22 is larger than the width formed by the outer functional elements 6 by a factor of 2 to 3 for example. The corresponding functional element gaps 22 are further preferably filled by insulating material, specifically in particular during production of an outer sheath 24, that is to say an outer insulation of the multifunctional cable 2 which encases the core 14 together with the outer functional elements 6.

According to one design variant, a corresponding outer sheath 24 is produced by at least two successive extrusion processes here, wherein, for example, a so-called tandem extruder is used for this purpose. Insulating material is thereby applied in each of the two extrusion processes, so that a kind of outer sheath layer is formed. Here, the first outer sheath layer 26 typically substantially fills the functional element gaps 22, whereas the second outer sheath layer 28 generally serves to realize as round a cross section as possible for the multifunctional cable 2. As an alternative to this, the filling of the functional element gaps 22 takes place in a plurality of extrusion processes and/or a filling material, for example as a band, is wound around the core 14 for filling the functional element gaps 22.

The invention is not limited to the exemplary embodiment described above. Rather, other variants of the invention can also be derived therefrom by a person skilled in the art without departing from the subject matter of the invention. In particular, all of the individual features described in connection with the exemplary embodiment can furthermore also be combined with one another in other ways without departing from the subject matter of the invention.

The invention claimed is:

1. A multifunctional cable, comprising:
a core being a sheathed line having at least one inner functional element and an insulating sheath encasing said at least one inner functional element;
at least one outer functional element wound around said sheathed line;
said at least one inner functional element being at least one electrical line having an insulation and said at least one outer functional element being at least one electrical line having an insulation;
said insulation of said at least one outer functional element being directly attached to said insulating sheath of said core; and
said at least one outer functional element being wound around said core to form mutually successive windings and functional element gaps between said mutually successive windings in a longitudinal direction of the cable.

2. The multifunctional cable according to claim 1, wherein said at least one inner functional element is one of a plurality of inner functional elements in said core, and said core and said inner functional elements are untwisted.

3. The multifunctional cable according to claim 1, wherein a press fit with a structurally prespecified press strength is formed between said core and said at least one outer functional element.

4. The multifunctional cable according to claim 1, wherein said at least one inner functional element and said at least one outer functional element are of mutually different designs.

5. The multifunctional cable according to claim 1, wherein said at least one inner functional element and said at least one outer functional element are part of a plurality of functional elements and said functional elements include functional elements of mutually different designs.

6. The multifunctional cable according to claim 1, wherein said at least one inner functional element is a wire and said at least one outer functional element is a wire.

7. The multifunctional cable according to claim 1, wherein said at least one inner functional element and said at least one outer functional element are mutually different cable embodiments.

8. The multifunctional cable according to claim 1, wherein said core has a core diameter that is greater than a diameter of said at least one outer functional element.

9. The multifunctional cable according to claim 1, wherein said at least one outer functional element is one of a plurality of outer functional elements and all of said outer functional elements are wound around said core and bear against one another.

10. The multifunctional cable according to claim 1, which comprises an outer sheath surrounding said outer functional elements.

11. The multifunctional cable according to claim 10, wherein the outer sheath enters into functional element gaps formed between said outer functional elements wound around said core.

12. The multifunctional cable according to claim 10, wherein said outer sheath has characteristics of being formed by at least two extrusion processes that were executed in succession.

13. The multifunctional cable according to claim 1, wherein the cable is an automotive cable.

14. The multifunctional cable according to claim 1, wherein said at least one inner functional element has a cross section with a diameter, and said functional element gaps are wider than said diameter.

15. A multifunctional cable extending in a longitudinal direction, the cable comprising:
a sheathed line forming a core, said sheathed line having a plurality of untwisted wires, each of said wires having a respective conductor and a respective insulation sheath surrounding said conductor, and said sheathed line having an insulating sheath surrounding said wires;
at least one wire having an insulation and being wound around said sheathed line in a spiral shape with a plurality of windings and forming gaps between adjacent windings; and
an outer sheath surrounding said at least one wire being wound around said sheathed line, said outer sheath entering said gaps between said adjacent windings.

16. The multifunctional cable according to claim 15, wherein said insulation of said at least one wire wound around said sheathed line is directly attached to said insulating sheath of said core.

17. The multifunctional cable according to claim 16, wherein said at least one wire wound around said sheathed line is one of a plurality of outer wires, and all of said outer wires are wound around said core and bear against one another.

18. The multifunctional cable according to claim 17, wherein each of said outer wires have a diameter, and said gaps are functional gaps being wider than twice said diameter.

* * * * *